(12) United States Patent
Arkko et al.

(10) Patent No.: US 8,121,539 B2
(45) Date of Patent: Feb. 21, 2012

(54) ANTENNA ARRANGEMENT

(75) Inventors: Aimo Arkko, Ruutana (FI); Juha Hallivuori, Tampere (FI)

(73) Assignee: Nokia Corporation, Espoo (FI)

(*) Notice: Subject to any disclaimer, the term of this patent is extended or adjusted under 35 U.S.C. 154(b) by 884 days.

(21) Appl. No.: 11/895,727

(22) Filed: Aug. 27, 2007

(65) Prior Publication Data

US 2009/0061796 A1    Mar. 5, 2009

(51) Int. Cl.
*H04B 5/00* (2006.01)
(52) U.S. Cl. .......... 455/41.1; 455/575.7; 455/575.5; 455/562.1; 343/702; 343/895; 343/718; 343/845; 340/572.1; 340/572.7
(58) Field of Classification Search .......... 455/41.1, 455/562.1, 575.5, 575.7; 340/572.7, 572.1, 340/572.8; 343/700 MS, 702, 895, 718, 343/846
See application file for complete search history.

(56) References Cited

U.S. PATENT DOCUMENTS

| | | | |
|---|---|---|---|
| 6,002,370 A * | 12/1999 | Mckinnon et al. | 343/700 MS |
| 6,201,501 B1 * | 3/2001 | Arkko et al. | 343/702 |
| 6,239,752 B1 * | 5/2001 | Blanchard | 343/702 |
| 6,259,407 B1 * | 7/2001 | Tran | 343/700 MS |
| 6,512,482 B1 * | 1/2003 | Nelson et al. | 343/700 MS |
| 6,646,328 B2 * | 11/2003 | Tsai | 257/659 |
| 6,765,536 B2 * | 7/2004 | Phillips et al. | 343/702 |
| 6,809,688 B2 * | 10/2004 | Yamada | 343/700 MS |
| 6,818,985 B1 * | 11/2004 | Coccioli et al. | 257/728 |
| 6,850,738 B2 * | 2/2005 | Nokkonen et al. | 455/83 |
| 7,057,514 B2 | 6/2006 | Mickle et al. | 340/572.7 |
| 7,212,788 B2 * | 5/2007 | Weber et al. | 455/78 |
| 7,250,911 B2 * | 7/2007 | Lindell | 343/702 |
| 7,342,299 B2 * | 3/2008 | Gaucher et al. | 257/674 |
| 7,405,698 B2 * | 7/2008 | de Rochemont | 343/700 MS |
| 7,436,679 B2 * | 10/2008 | Iijima et al. | 361/760 |
| 7,449,977 B2 * | 11/2008 | Schoning et al. | 333/134 |
| 7,466,998 B2 * | 12/2008 | O et al. | 455/575.7 |
| 7,502,598 B2 * | 3/2009 | Kronberger et al. | 455/123 |
| 7,518,221 B2 * | 4/2009 | Gaucher et al. | 257/676 |
| 7,528,785 B2 * | 5/2009 | Forster et al. | 343/767 |
| 7,532,162 B2 * | 5/2009 | Braam | 343/700 MS |
| 7,545,336 B2 * | 6/2009 | Naito | 343/788 |
| 7,589,678 B2 * | 9/2009 | Perunka et al. | 343/702 |
| 7,679,565 B2 * | 3/2010 | Sorvala | 343/700 MS |
| 7,916,086 B2 * | 3/2011 | Koskiniemi et al. | 343/700 MS |
| 2004/0219895 A1 | 11/2004 | O. et al. | 455/121 |
| 2006/0243811 A1 | 11/2006 | Koyama et al. | 235/492 |
| 2007/0051807 A1 | 3/2007 | Yamaguchi | 235/451 |
| 2008/0061631 A1 * | 3/2008 | Fouquet et al. | 307/109 |

(Continued)

FOREIGN PATENT DOCUMENTS

EP    1 845 481 A1    4/2006

(Continued)

OTHER PUBLICATIONS

Song, C.T.P., et al., "Novel RF Front End Antenna Package", IEEE Proc.-Antennas Propag., vol. 150, No. 4, Aug. 2003, pp. 290-294.

(Continued)

*Primary Examiner* — Marceau Milord
(74) *Attorney, Agent, or Firm* — Harrington & Smith

(57) ABSTRACT

A multi-part, distributed antenna arrangement including: an antenna element as a first part; and a semiconductor chip as a second part, separated from the first part, wherein the semiconductor chip comprises integrated radio frequency circuitry and a coupling element for wirelessly coupling the integrated radio frequency circuitry with the antenna element.

29 Claims, 2 Drawing Sheets

U.S. PATENT DOCUMENTS

2008/0242237 A1\* 10/2008 Rofougaran et al. ............ 455/77

FOREIGN PATENT DOCUMENTS

| WO | WO 2007/066267 A2 | 6/2007 |
| WO | WO 2007/105607 A1 | 9/2007 |

OTHER PUBLICATIONS

Huang, D., et al., "A 60 GHz CMOS VCO Using On-Chip Resonator with Embedded Artificial Dielectric for Size, Loss and Noise Reduction", RFID and RF Directions, 17.4, 2006, IEEE International Solid-State Circuits Conference, 10 pgs.

\* cited by examiner

ANTENNA ARRANGEMENT

FIELD OF THE INVENTION

Embodiments of the present invention relate to an antenna arrangement.

BACKGROUND TO THE INVENTION

It is now common for an antenna arrangement to comprise a printed wiring board (PWB) on which are mounted an antenna element and connected radio frequency components that enable reception and/or transmission using the antenna element.

The antenna element and the radio frequency components can occupy a significant volume adjacent the PWB. This constraint may affect which other components may be positioned on or adjacent the PWB and may consequently affect the functionality of the radio communication apparatus.

It would therefore be desirable to provide an improved antenna arrangement.

BRIEF DESCRIPTION OF VARIOUS EMBODIMENTS OF THE INVENTION

According to various embodiments of the invention there is provided a multi-part, distributed antenna arrangement comprising: an antenna element as a first part; and a semiconductor chip as a second part, galvanically separated from the first part, wherein the semiconductor chip comprises integrated radio frequency circuitry and a coupling element for wirelessly coupling the integrated radio frequency circuitry with the antenna element.

The integration of radio frequency components within the semiconductor chip saves space and the electromagnetic coupling between the first and second parts provides for greater design freedom in positioning the parts.

According to various embodiments of the invention there is provided a semiconductor chip comprising: integrated radio frequency circuitry and a coupling element configured to electromagnetically couple the integrated radio frequency circuitry with an off-chip antenna element.

According to various embodiments of the invention there is provided an antenna arrangement comprising: a chip; an off-chip antenna element; on-chip radio frequency circuitry; and an on-chip coupling element for wirelessly coupling the on-chip radio frequency circuitry with the off-chip antenna element.

According to various embodiments of the invention there is provided a method of manufacturing a radio communications apparatus comprising locating an antenna element adjacent a semiconductor chip, wherein the semiconductor chip comprises radio frequency circuitry and a coupling element for wirelessly coupling the radio frequency circuitry with the antenna element. The antenna element may be integrated with a housing of the radio communications apparatus and may be located by assembling the housing.

BRIEF DESCRIPTION OF THE DRAWINGS

For a better understanding of various embodiments of the present invention reference will now be made by way of example only to the accompanying drawings in which.

DETAILED DESCRIPTION OF VARIOUS EMBODIMENTS OF THE INVENTION

Figure 1:
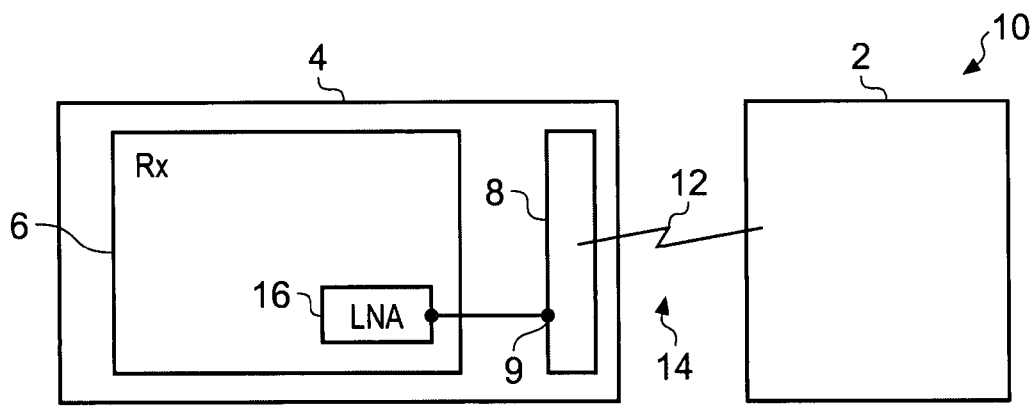
FIGS. 1, 2 and 3 schematically illustrate multi-part, distributed antenna arrangements 10 comprising an antenna element as a first part and a semiconductor chip as a second part.
Figure 2:
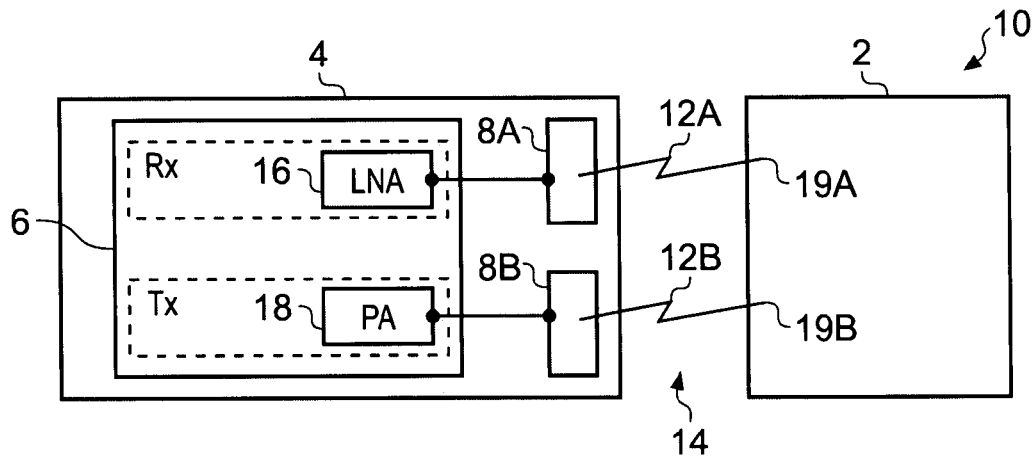
Figure 3:
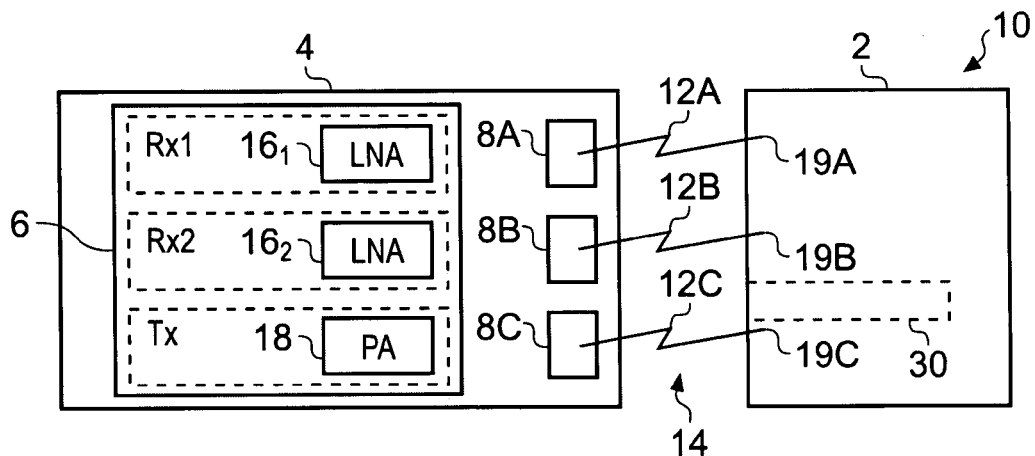

FIGS. 1, 2 and 3 schematically illustrate multi-part, distributed antenna arrangements 10 comprising: an antenna element 2 as a distinct first part; and a semiconductor chip 4 as a distinct second part, galvanically separated from the first part by a gap 14. Galvanically separated means that the antenna element 2 and the semiconductor chip 4 are not connected by a connection that provides a signal carrying current path. They may be separated by a dielectric which could, for example, be an air gap or an intervening material. In some embodiments, the antenna element 2 and the semiconductor chip 4 may be 'galvanically isolated'. Galvanically isolated means that the antenna element 2 and the semiconductor chip 4 are not connected by a connection that provides a dc current path.

The semiconductor chip 4 may comprise a substrate, such as a monolithic semiconductor substrate. The substrate may be silicon on insulator.

The term 'on-chip' will be used to describe components that are in or on the substrate. The term 'integrated on chip' will be used to describe components that are integrated in or on the substrate during manufacture of the semiconductor chip in contradistinction to components that are attached to the semiconductor chip post-manufacture. The term 'off-chip' will be used to describe components that are physically separated from the substrate.

The semiconductor chip 4 comprises on-chip radio frequency circuitry 6 connected to an on-chip conductor 8. The conductor 8 is configured to electromagnetically couple 12 the integrated radio frequency circuitry 6 with an off-chip antenna element 2. The antenna element 2 may be the only radio frequency component that is off-chip.

Figure 5:
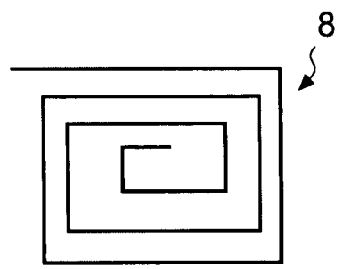
FIG. 5 schematically illustrates a spiral conductor for coupling with the antenna element.

The conductor 8 operates as a parasitic feed to the off-chip antenna element 2. The conductor 8 may have a spiral shape as illustrated in FIG. 5. The off-chip antenna element may, for example, be configured as a dipole strip or a patch.

The radio frequency circuitry 6 is integrated on chip. The conductor 8 may be on chip or integrated on chip depending upon implementation.

When the conductor 8 is integrated on chip it operates as a coupling element that is configured to electromagnetically couple 12 the integrated radio frequency circuitry 6 with an off-chip antenna element 2.

When the conductor 8 is on chip, a node 9 that is integrated on chip is used to galvanically connect to the conductor 8. The node 9 operates as a coupling element that is configured to electromagnetically couple 12 the integrated radio frequency circuitry 6 with an off-chip antenna element 2 using the conductor 8.

The integrated radio frequency circuitry 6 includes amplification circuitry 16, 18. If the radio frequency circuitry 6 is operable as a receiver then it may include a low noise amplifier 16 in the receiver circuit (Rx). If the radio frequency circuitry 6 is operable as a transmitter then it may include a low power amplifier 18 in the transmitter circuit (Tx). The radio frequency circuitry may include one receiver circuit (Rx) as illustrated in FIGS. 1 and 2 or more than one receiver circuit (Rx1, Rx2) as illustrated in FIG. 3. The radio frequency circuitry may include one transmitter circuit (Tx) as illustrated in FIGS. 2 and 3 or more than one transmitter circuit (not illustrated).

Figure 4:
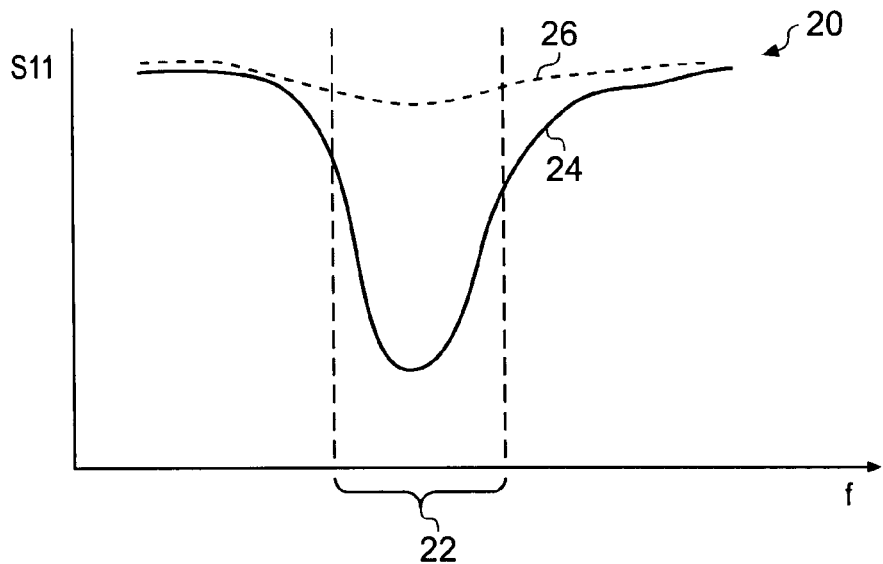
FIG. 4 illustrates schematically a possible insertion loss (S11) plot for the distributed antenna arrangement.

FIG. 4 illustrates schematically a possible insertion loss (S11) plot 20 for the antenna arrangement 10 which has an operational frequency band 22. Depending upon the design of the antenna arrangement 10, it may have more than one operational frequency band. However, only a single band is illustrated.

The figure has a first plot 24 which represents the insertion loss of the antenna arrangement when the off-chip antenna element 2 is present as illustrated in FIGS. 1 to 3. The antenna arrangement 10 has an operational bandwidth that coincides with the operational frequency band. The antenna arrangement is sufficiently efficient at this frequency band to be able to operate as a receiver and/or transmitter.

The frequency band may, for example, cover one or more of the following bands: AM radio (0.535-1.705 MHz); FM radio (76-108 MHz); Bluetooth (2400-2483.5 MHz); WLAN (2400-2483.5 MHz); HLAN (5150-5850 MHz); GPS (1570.42-1580.42 MHz); US-GSM 850 (824-894 MHz); EGSM 900 (880-960 MHz); EU-WCDMA 900 (880-960 MHz); PCN/DCS 1800 (1710-1880 MHz); US-WCDMA 1900 (1850-1990 MHz); WCDMA 2100 (Tx: 1920-1980 MHz Rx: 2110-2180 MHz); PCS1900 (1850-1990 MHz); UWB Lower (3100-4900 MHz); UWB Upper (6000-10600 MHz); DVB-H (470-702 MHz); DVB-H US (1670-1675 MHz); DRM (0.15-30 MHz); Wi Max (2300-2400 MHz, 2305-2360 MHz, 2496-2690 MHz, 3300-3400 MHz, 3400-3800 MHz, 5250-5875 MHz); DAB (174.928-239.2 MHz, 1452.96-1490.62 MHz); RFID LF (0.125-0.134 MHz); RFID HF (13.56-13.56 MHz); RFID UHF (433 MHz, 865-956 MHz, 2450 MHz).

The figure has a second plot 26 which represents the insertion loss of the antenna arrangement when the off-chip antenna element 2 is removed. The resulting structure does not have an operational bandwidth that coincides with the operational frequency band. The structure is not sufficiently efficient at this frequency band 22 to be able to operate as a receiver and/or transmitter. The close proximity of conductor 8 and the antenna element 2 enables the conductor 8 to operate as an effective electromagnetic (parasitic) wireless feed 12 to the parasitic antenna element 2 at the frequency band 22. The feed 12 is 'wireless' in the sense that the antenna element 2 and the conductor 8 couple via a dielectric such as air rather than via a galvanic connection. The conductor 6 itself, without the parasitic antenna element 2, is inoperable as an antenna at the desired frequency band 22.

The parasitic antenna element 2 increases efficiency. Without the parasitic antenna element 2 the efficiency in the frequency band 22 may be <5%, whereas with the parasitic antenna element 2 the efficiency in the frequency band 22 may be >60% i.e. >10 times more efficient.

The conductor 8 can be part of a resonance circuit on-chip. That resonance circuit defines the coupling frequency between the conductor 8 and the wideband antenna element 2. If there is a large bandwidth at antenna 2 (BW~1 GHz to 6 GHz), the operational bandwidth of the antenna arrangement 10 can be tuned to anything within that large bandwidth range by altering the relatively narrowband resonant frequency of the resonance circuit.

If the antenna element 2 has for example a multi resonance structure, the on-chip resonance circuit may be dynamically adapted to wirelessly couple 12 to anyone of the antenna element 2 resonances.

Referring to FIG. 2, the integrated radio frequency circuitry 6 comprises low noise amplification circuitry 16 and power amplification circuitry 18. The semiconductor chip 4 also comprises a first conductor 8A, adjacent a first portion 19A of the antenna element 2, that electromagnetically couples the low noise amplification circuitry 16 with the antenna element 2 for radio reception. The semiconductor chip 4 also comprises a second conductor 8B that is separate and distinct from the first conductor 8A. The second conductor 8B is adjacent a second portion 19B of the antenna element 2 and electromagnetically couples the power amplification circuitry 18 with the antenna element 2 for radio transmission.

Although a single antenna element 2 is described which is shared by the separate conductors 8A and 8B, in other embodiments a separate and distinct antenna element may be provided for each of the respective separate and distinct conductors 8A, 8B.

Referring to FIG. 3, the antenna arrangement is similar to that illustrated in FIG. 2. However, the integrated radio frequency circuitry 6 comprises two low noise amplification circuits $16_1$ and $16_2$. Each of the amplification circuits $16_1$, $16_2$, 18 is galvanically connected to its own distinct and separate conductor 8A, 8B, 8C which are adjacent respective first, second and third portions 19A, 19B, 19C of the same antenna element 2. The two receivers Rx1 and Rx2 provide for diversity reception.

The antenna element 2 may have a slot between the second portion 19B and the third portion 19C of the antenna element 2 to provide isolation between a portion of the antenna element 2 used for reception and a portion used for transmission.

Although a single antenna element 2 is described which is shared by the separate conductors 8A, 8B and 8C, in other embodiments a separate and distinct antenna element may be provided for each of the respective separate and distinct conductors 8A, 8B, 8C.

Figure 6:
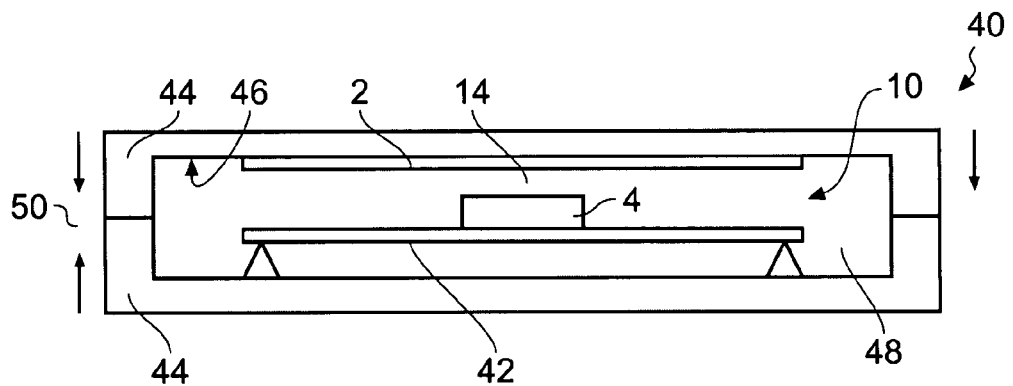
FIG. 6 schematically illustrates a radio communications apparatus comprising the distributed antenna arrangement.

FIG. 6 schematically illustrates an apparatus 40 comprising one or more of the described antenna arrangements 10. The apparatus 40 is a radio communications apparatus—it may be configured to operate as a receiver or as a transmitter or as a transceiver.

The apparatus 40 may be a hand portable apparatus or a handset.

The apparatus 40 comprises a housing 44 that defines an interior cavity 48 of the apparatus. The cavity need not be wholly enclosed i.e. there may be apertures in the housing. The cavity 48 provides a volume for receiving at least the semiconductor chip 4.

In the illustrated embodiment, a printed wiring board (PWB) 42 is supported within the cavity 48. The semiconductor chip 4 is attached to the PWB 42.

The antenna element 2 is part of the housing 44. In this embodiment, the housing has an interior surface 46 which defines the cavity 48. The portion of the interior surface 46 of the housing 44 that opposes the semiconductor chip 4 carries the parasitic antenna element 2. This enables the antenna element 2 to be brought into close proximity with the conductor 8 of the chip 4 when the housing is assembled. The integration of the antenna element 2 within the housing 44 also frees up space on the PWB 42 for other components.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus comprising:
   a semiconductor chip; and
   an off-chip antenna element, wherein the off-chip antenna element is galvanically separated from the semiconductor chip;
   wherein the semiconductor chip comprises integrated radio frequency circuitry and an on-chip wireless coupling element configured to wirelessly couple the integrated radio frequency circuitry with the off-chip antenna element; and
   wherein the integrated radio frequency circuitry includes amplification circuitry.

2. An apparatus as claimed in claim 1, wherein the wireless coupling element provides for a parasitic feed between the integrated radio frequency circuit and the antenna element.

3. An apparatus as claimed in claim 1, wherein the arrangement is operable at a first frequency band when the antenna element is present and is inoperable at the first frequency band if the antenna element is removed.

4. An apparatus as claimed in claim 1, wherein the arrangement is operable at a first frequency band and wherein the wireless coupling element is a node connected to a conductor that is dimensioned and positioned to wirelessly couple with the antenna element at a first frequency band.

5. An apparatus as claimed in claim 1, wherein the arrangement is operable at a first frequency band and wherein the wireless coupling element is a conductor that is dimensioned and positioned to wirelessly couple with the antenna element at a first frequency band.

6. An apparatus as claimed in claim 5, wherein the conductor is integrated with the semiconductor chip.

7. An apparatus as claimed in claim 1, wherein the integrated radio frequency circuitry comprises first amplification circuitry and second amplification circuitry and the semiconductor chip comprises a first wireless coupling element, adjacent a first portion of the antenna element, configured to wirelessly couple the first amplification circuitry with the antenna element and a second wireless coupling element, adjacent a second portion of the antenna element, configured to wirelessly couple the second amplification circuitry with the antenna element.

8. An apparatus as claimed in claim 7, wherein the first amplification circuitry is configured for reception and the second amplification circuitry is configured for transmission.

9. An apparatus as claimed in claim 7, wherein the first amplification circuitry is configured for reception and the second amplification circuitry is configured for diversity reception.

10. An apparatus as claimed in claim 7, wherein the first amplification circuitry is configured for reception at a first frequency band and the second amplification circuitry is configured for simultaneous reception at a second different frequency band.

11. An apparatus as claimed in claim 7, wherein the antenna element has a slot between the first portion and the second portion.

12. An apparatus as claimed in claim 1, wherein the semiconductor chip is a silicon on insulator chip.

13. A radio communications apparatus comprising the apparatus as claimed in claim 1.

14. A radio communications apparatus as claimed in claim 13, comprising an exterior housing defining a cavity that houses the semiconductor chip, wherein the exterior housing carries the antenna element at a position adjacent the semiconductor chip.

15. A radio communications apparatus as claimed in claim 13, comprising an exterior housing defining a cavity that houses the semiconductor chip, wherein the exterior housing is the antenna element at a position adjacent the semiconductor chip.

16. A semiconductor chip comprising:
   integrated radio frequency circuitry and an on-chip wireless coupling element configured to wirelessly couple the integrated radio frequency circuitry with an off-chip antenna element, and wherein the integrated radio frequency circuitry includes amplification circuitry.

17. A semiconductor chip as claimed in claim 16, wherein the wireless coupling element comprises a conductor that is dimensioned and positioned to wirelessly couple with the antenna element at a first frequency band.

18. A semiconductor chip as claimed in claim 16, wherein the conductor is integrated within the semiconductor chip.

19. A semiconductor chip as claimed in claim 16, wherein the integrated radio frequency circuitry comprises first amplification circuitry and second amplification circuitry and the semiconductor chip comprises a first wireless coupling element, configured to position adjacent a first portion of the antenna element and a second wireless coupling element configured to position adjacent a second portion of the antenna element or a different antenna element.

20. A semiconductor chip as claimed in claim 19, wherein the first amplification circuitry is configured for reception and the second amplification circuitry is configured for transmission.

21. A semiconductor chip as claimed in claim 19, wherein the first amplification circuitry is configured for reception and the second amplification circuitry is configured for reception.

22. A semiconductor chip as claimed in claim 16, wherein the semiconductor chip is a silicon on insulator chip.

23. An antenna arrangement comprising;
   a chip;
   an off-chip antenna element;
   on-chip radio frequency circuitry, wherein the on-chip radio frequency circuitry includes amplification circuitry; and
   an on-chip wireless coupling element configured to wirelessly couple the on-chip radio frequency circuitry with the off-chip antenna element.

24. A method comprising:
   locating an antenna element adjacent a semiconductor chip, wherein the semiconductor chip comprises radio frequency circuitry, which includes amplification circuitry, and an on-chip coupling element configured to wirelessly couple the radio frequency circuitry with the antenna element, thereby manufacturing a radio communications apparatus.

25. A method as claimed in claim 24, wherein the antenna element is integrated with a housing of the radio communications apparatus and the antenna element is located by assembling the housing.

26. A multi-part, distributed antenna arrangement comprising:
   an off-chip antenna element as a first part; and
   a semiconductor chip as a distinct second part, separated from the first part, wherein the semiconductor chip comprises integrated radio frequency circuitry, which includes amplification circuitry, and an on-chip wireless coupling element configured to wirelessly couple the integrated radio frequency circuitry with the antenna element.

27. A multi-part, distributed antenna arrangement comprising:
   an off-chip antenna element as a first part; and
   a semiconductor chip as a distinct second part, galvanically separated from the first part, wherein the semiconductor chip comprises integrated radio frequency circuitry, which includes amplification circuitry, and an on-chip wireless means for wirelessly coupling the integrated radio frequency circuitry with the antenna element.

28. A multi-part, distributed antenna arrangement comprising:
   an antenna arrangement as a first part; and
   a semiconductor chip as a distinct second part, galvanically separated from the first part;
   wherein the semiconductor chip comprises integrated radio frequency circuitry and an on-chip wireless coupling element configured to wirelessly couple the integrated radio frequency circuitry with the antenna element;
   wherein the integrated radio frequency circuitry includes amplification circuitry; and
   wherein the arrangement is operable at a first frequency band and the efficiency of the arrangement in the first frequency when the antenna element is present is a factor of ten or more greater than when the antenna element is removed.

29. A multi-part, distributed antenna arrangement as claimed in claim 28, wherein the first part of the antenna arrangement comprises a housing and the antenna element and the second part comprises the semiconductor chip, wherein the antenna arrangement has a first assembled operable configuration in which the housing of the first part is attached to the second part and the antenna arrangement has a second unassembled inoperable configuration in which the first part is not attached to the second part and the antenna element is therefore not present in the antenna arrangement, wherein the antenna arrangement is operable in the assembled configuration and inoperable in the unassembled configuration.

\* \* \* \* \*